(12) United States Patent
Mutter et al.

(10) Patent No.: US 11,784,849 B2
(45) Date of Patent: Oct. 10, 2023

(54) COMMUNICATION CONTROL DEVICE FOR A USER STATION FOR A SERIAL BUS SYSTEM, AND METHOD FOR COMMUNICATING IN A SERIAL BUS SYSTEM

(71) Applicant: Robert Bosch GmbH, Stuttgart (DE)

(72) Inventors: Arthur Mutter, Neuhausen (DE); Simon Weissenmayer, Flein (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/457,478

(22) Filed: Dec. 3, 2021

(65) Prior Publication Data
US 2022/0217012 A1 Jul. 7, 2022

(30) Foreign Application Priority Data
Jan. 7, 2021 (DE) .................... 10 2021 200 080.0

(51) Int. Cl.
*G06F 13/42* (2006.01)
*H04L 12/40* (2006.01)

(52) U.S. Cl.
CPC .... *H04L 12/40013* (2013.01); *G06F 13/4282* (2013.01); *H04L 12/40019* (2013.01); *H04L 12/40084* (2013.01); *H04L 2012/40215* (2013.01)

(58) Field of Classification Search
CPC ......... H04L 12/40013; H04L 12/40019; H04L 12/40084; H04L 2012/40215; G06F 13/4282
See application file for complete search history.

(56) References Cited

U.S. PATENT DOCUMENTS

| | | | | |
|---|---|---|---|---|
| 2011/0038388 A1* | 2/2011 | Hartwich | .............. | H04L 7/0331 370/503 |
| 2014/0016654 A1* | 1/2014 | Yakash | ................. | H04L 12/413 370/516 |
| 2014/0337549 A1* | 11/2014 | Hartwich | ............ | G06F 13/4282 710/106 |

(Continued)

OTHER PUBLICATIONS

ISO 11898-1:2015 Standard, 2015, pp. 1-74.

*Primary Examiner* — Henry Tsai
*Assistant Examiner* — Harry Z Wang
(74) *Attorney, Agent, or Firm* — NORTON ROSE FULBRIGHT US LLP; Gerard Messina

(57) ABSTRACT

A communication control device for a user station for a serial bus system. The communication control device controls a communication of the user station with at least one other user station of the bus system, and generates a transmission signal for transmission onto a bus of the bus system and/or to receive a signal from the bus. The communication control device generates the transmission signal according to a frame in which bits having a predetermined temporal length are provided. The communication control device is designed to shorten, in comparison to some other bit of the bit sequence, at least one bit in the frame that is situated in a bit sequence of at least two bits having the same logical value, and the communication control device is designed to not shorten bits that are not situated in a bit sequence of at least two bits having the same logical value.

16 Claims, 6 Drawing Sheets

(56) References Cited

U.S. PATENT DOCUMENTS

2017/0109309 A1\* 4/2017 van de Burgt ...... H04L 12/4013
2017/0126679 A1\* 5/2017 Fredriksson .......... H04L 63/123
2018/0159699 A1\* 6/2018 Yang ................. H04L 12/40032

\* cited by examiner

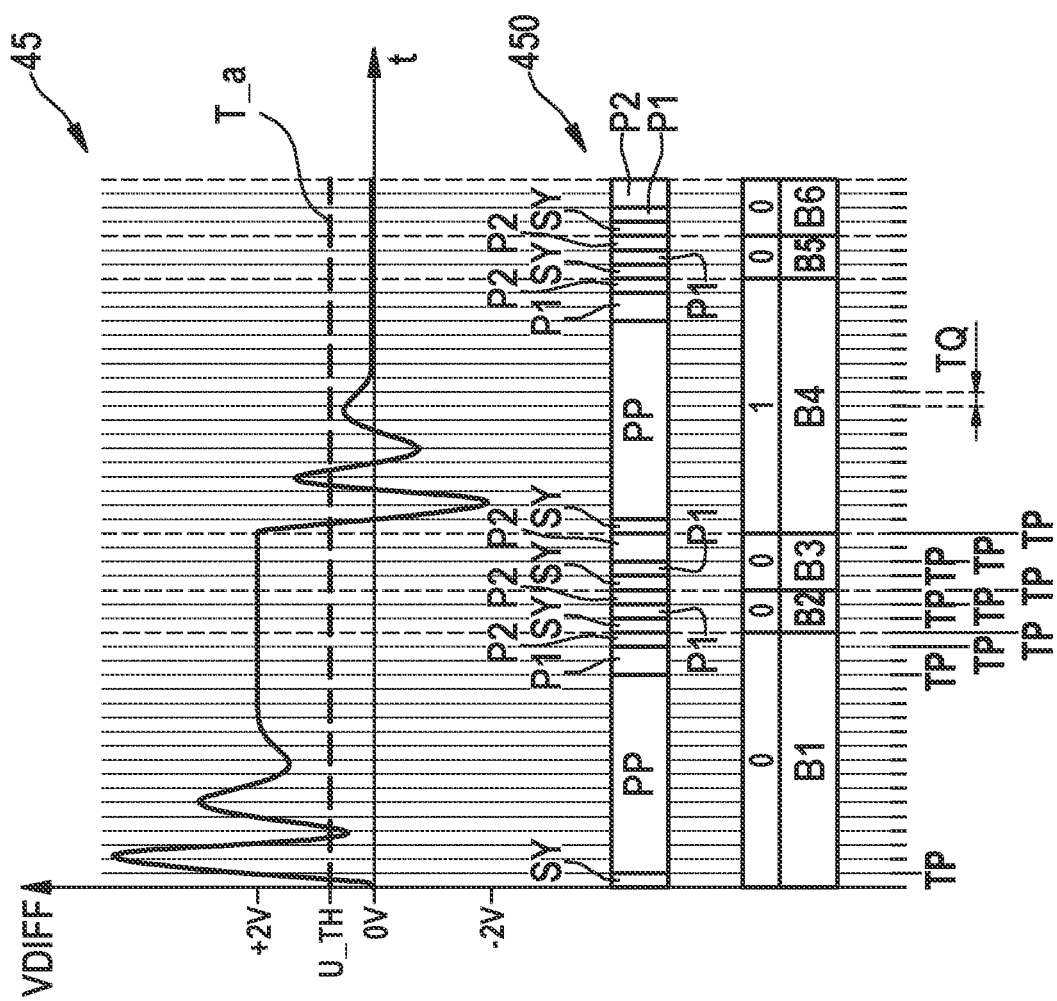

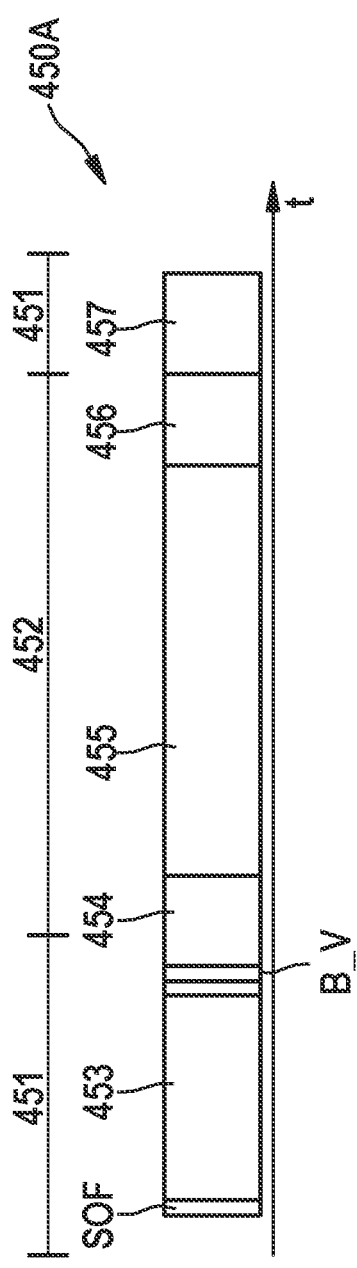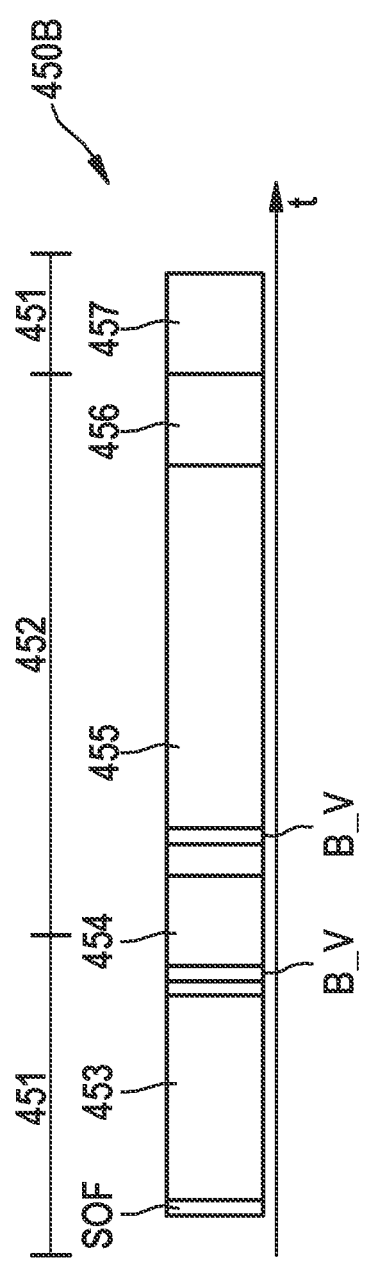

COMMUNICATION CONTROL DEVICE FOR A USER STATION FOR A SERIAL BUS SYSTEM, AND METHOD FOR COMMUNICATING IN A SERIAL BUS SYSTEM

CROSS REFERENCE

The present application claims the benefit under 35 U.S.C. § 119 of German Patent Application No. DE 102021200080.0 filed on Jan. 7, 2021, which is expressly incorporated herein by reference in its entirety.

FIELD

The present invention relates to a communication control device for a user station for a serial bus system, and a method for communicating in a serial bus system that operates with a high data rate and a high level of error robustness.

BACKGROUND INFORMATION

Bus systems for the communication between sensors and control units, for example in vehicles, are intended to allow the transfer of a large data volume, depending on the number of functions of a technical facility or a vehicle. In many applications, it is necessary to transfer the data from the sender to the receiver at the highest possible data transfer rate.

At the present time, in vehicles, a bus system is used in the introduction phase, in which data are transferred as messages under the ISO 11898-1:2015 standard, as a CAN protocol specification with CAN FD. The messages are transferred between the bus users of the bus system, such as the sensor, control unit, transducer, etc. For this purpose, the message is transmitted onto the bus in a frame, in which a switch is made between two communication phases. In the first communication phase (arbitration), it is negotiated which of the user stations of the bus system is allowed to transmit its frame onto the bus in the subsequent second communication phase (data phase or transmission of the useful data). With most manufacturers, CAN FD is used in the vehicle at a 500 kbit/s arbitration bit rate and a 2 Mbit/s data bit rate in the first step. During the transfer, a switch is thus to be made back and forth on the bus between a slow operating mode and a fast operating mode.

To allow even higher data rates in the second communication phase, at the present time a successor bus system for CAN FD (referred to as CAN XL) is being developed, which is presently standardized by the CAN in Automation (CiA) organization. In addition to strict data transport, CAN XL is intended to also support other functions via the CAN bus, such as functional safety, data security, and quality of service (QoS). These are basic properties that are required in an autonomously traveling vehicle.

Errors may occur during the transfer of data in a frame via a channel (CAN bus). For example, a bit may be falsified or edges between bits may be shifted due to external influences, in particular irradiation or reflections at bus ends. In addition, as the result of nonideal clock sources, a phase error may occur in a user station, which for the present communication on the bus is not a sender, but instead, only a receiver of the message (reception node).

These frame conditions contribute to a reduction in the quantity of data that is effectively transferable per unit of time (the net data rate).

SUMMARY

An object of the present invention is to provide a communication control device for a user station for a serial bus system, and a method for communicating in a serial bus system, which solve the above-mentioned problems. In particular, an object is to provide a communication control device for a user station for a serial bus system, and a method for communicating in a serial bus system in which a high level of error robustness of the communication is achievable, even for a high data rate and optionally an increase in the quantity of the useful data per frame.

The object may be achieved by a communication control device for a user station for a serial bus system, in accordance with an example embodiment of the present invention. In accordance with an example embodiment of the present invention, the communication control device is designed to control a communication of the user station with at least one other user station of the bus system, and to generate a transmission signal for transmission onto a bus of the bus system and/or to receive a signal from the bus, the communication control device being designed to generate the transmission signal according to a frame in which bits having a predetermined temporal length are provided, the communication control device being designed to shorten, in comparison to some other bit of the bit sequence, at least one bit in the frame that is situated in a bit sequence of at least two bits having the same logical value, and the communication control device being designed to not shorten bits that are not situated in a bit sequence of at least two bits having the same logical value.

Due to the embodiment of the communication control device, it is possible to transfer more data per unit of time via the bus than previously without reducing the error robustness of the communication in the bus system.

With the communication control device, in a serial bus system, in particular for CAN or CAN FD or CAN XL, a robust communication may still be made possible with a further increased data rate.

By use of the communication control device in the bus system, it is possible to maintain an arbitration from CAN in a first communication phase and still increase the transfer rate considerably compared to CAN or CAN FD or CAN XL.

The method carried out by the communication control device may also be used when at least one CAN user station and/or at least one CAN FD user station that transmit(s) messages according to the CAN protocol and/or CAN FD protocol are/is present in the bus system.

Advantageous further embodiments of the communication control device are disclosed herein.

Each bit is possibly divided into four segments over time without shortening, a first sampling point being provided between the first segment and the second segment, and a second sampling point being provided between the third segment and the fourth segment, and the communication control device being designed to use the first and second sampling points for determining the logical value of the bit in a reception signal which the communication control device receives for the transmission signal that is transferred via the bus.

Two segments may be situated between the first sampling point and the second sampling point without shortening the bit.

According to one exemplary embodiment of the present invention, the communication control device may be designed to shorten the second bit of the bit sequence and each subsequent bit of the bit sequence.

According to one exemplary embodiment of the present invention, the communication control device may be designed to shorten the segment in the second bit of the bit sequence directly preceding the second sampling point and each subsequent bit in the bit sequence, the communication control device being designed to shorten the segment in the second bit of the bit sequence situated directly after the second sampling point and each subsequent bit in the bit sequence less than the segment in the last bit of the bit sequence situated directly after the second sampling point.

The communication control device may be designed to shorten a bit, situated between a first bit and a last bit of the bit sequence, more than the last bit of the bit sequence.

According to one exemplary embodiment of the present invention, the communication control device is designed to shorten the last bit of the bit sequence more than the first bit of the bit sequence.

According to another embodiment of the present invention, the communication control device may be designed to individually determine for the bit the length of a shortening of a bit of the bit sequence.

It is possible for the communication control device to include an evaluation block for evaluating whether a bit sequence of at least two bits having the same logical value is present in a transmission signal that is generated by the communication control device, and a bit length shortening block for shortening at least one bit in the bit sequence that has been determined by the evaluation block during the evaluation.

The communication control device may include a bit length lengthening block for lengthening at least one bit in the bit sequence, which is contained as a shortened bit in a signal that is received from the bus. Additionally or alternatively, the communication control device may include an error frame counting block for counting error frames that are received from the bus.

In addition, the communication control device may be designed to insert at least one predetermined bit into the transmission signal which indicates to a reception node in the bus system that a signal presently received from the bus includes at least one bit that is situated in a bit sequence of at least two bits having the same logical value, and is shortened in comparison to some other bit of the bit sequence.

The communication control device may be designed to generate the transmission signal in such a way that for a message that is exchanged between user stations of the bus system, the bit time of a signal transmitted onto the bus in the first communication phase may be different from a bit time of a signal transmitted in the second communication phase, and in the first communication phase, it is negotiated which of the user stations of the bus system in the subsequent second communication phase obtains, at least temporarily, exclusive, collision-free access to the bus, and the communication control device being designed to shorten at least one bit of a bit sequence, which includes at least two bits having the same logical value, in the first and/or second communication phase.

The frame that is formed for the message may have a design that is compatible with CAN FD and/or CAN XL.

The communication control device described above may be part of a user station for a bus system that also includes a transceiver device for transmitting the transmission signal onto the bus of the bus system, the transceiver device being designed to transmit the entire frame onto the bus in an operating mode for transmitting and receiving the frame in the first communication phase.

The user station described above may be part of a bus system which also includes a bus and at least two user stations that are connected to one another via the bus in such a way that they may communicate serially with one another. At least one of the at least two user stations is a user station described above.

Moreover, the object stated above may be achieved by a method for communicating in a serial bus system according to an example embodiment of the present invention. In accordance with an example embodiment of the present invention, the method is carried out using a communication control device for a user station of the bus system, the method including the steps: controlling, via the communication control device, a communication of the user station with at least one other user station of the bus system, and for generating a transmission signal for transmission onto a bus of the bus system and/or receiving a signal from the bus, the communication control device generating the transmission signal according to a frame in which bits having a predetermined temporal length are provided, the communication control device shortening in the frame, in comparison to some other bit of the bit sequence, at least one bit that is situated in a bit sequence of at least two bits having the same logical value, and the communication control device not shortening bits that are not situated in a bit sequence of at least two bits having the same logical value.

The method yields the same advantages as stated above with regard to the user station.

Further possible implementations of the present invention also include combinations, even if not explicitly stated, of features or specific embodiments described above or discussed below with regard to the exemplary embodiments. Those skilled in the art will also add individual aspects as enhancements or supplements to the particular basic form of the present invention, in view of the disclosure herein.

BRIEF DESCRIPTION OF THE DRAWINGS

The present invention is described in greater detail below with reference to the figures, and based on exemplary embodiments.

FIG. 8 shows a temporal profile of a portion of a signal that occurs during transmission of a frame to terminals of the user station according to a second exemplary embodiment, when the bit length adaptation module is active.

FIG. 9 shows a diagram for illustrating the design of a message that may be transmitted from a user station of the bus system according to a fourth exemplary embodiment of the present invention.

FIG. 10 shows a diagram for illustrating the design of a message that may be transmitted from a user station of the bus system according to a fifth exemplary embodiment of the present invention.

Unless stated otherwise, identical or functionally equivalent elements are provided with the same reference numerals in the figures.

DETAILED DESCRIPTION OF EXAMPLE EMBODIMENTS

Figure 1:
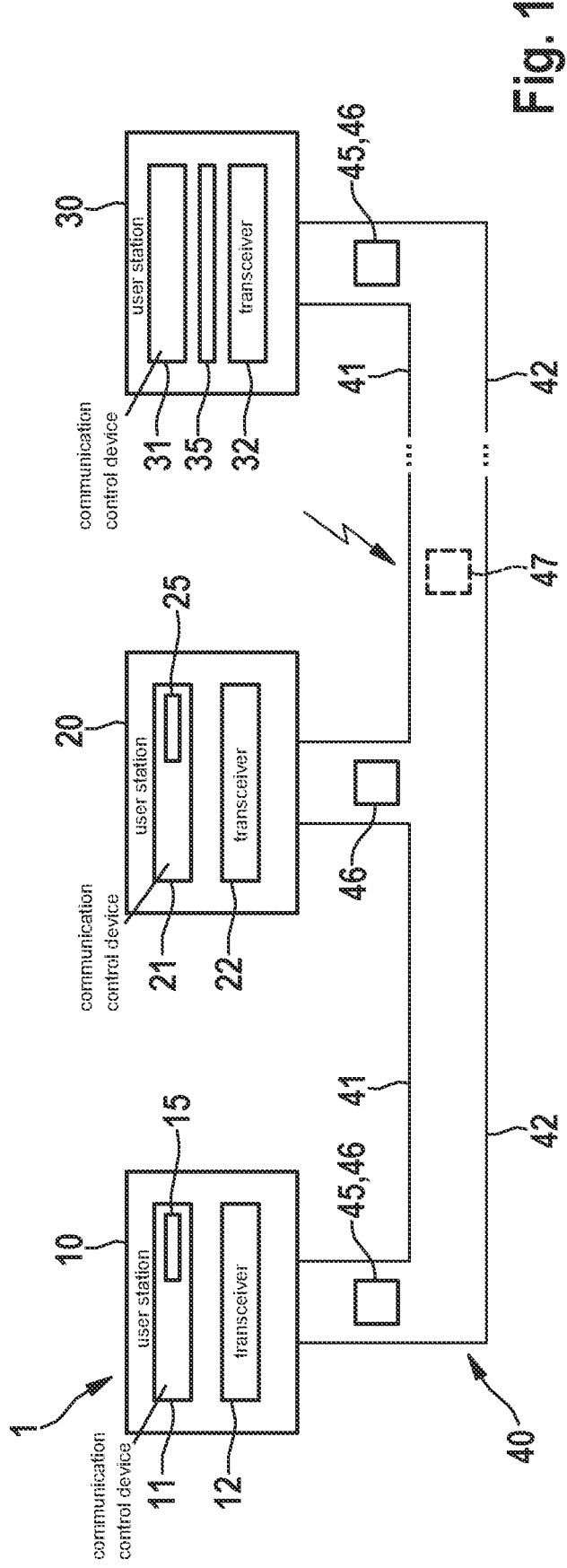
FIG. 1 shows a simplified block diagram of a bus system according to a first exemplary embodiment of the present invention.

FIG. 1 shows as an example a bus system 1 that is in particular the basis for the design of a CAN bus system, a CAN FD bus system, a CAN XL bus system, and/or modifications thereof, as described below. Bus system 1 may be used in a vehicle, in particular a motor vehicle, an aircraft, etc., or in a hospital, and so forth.

In FIG. 1, bus system 1 includes a plurality of user stations 10, 20, 30, each of which is connected to a first bus wire 41 and a second bus wire 42 at a bus 40. Bus wires 41, 42 may also be referred to as CAN_H and CAN_L or CAN XL_H and CAN XL_L, and are used for electrical signal transfer after coupling in the dominant levels or generating recessive levels or other levels for a signal in the transmission state. Messages 45, 46 in the form of signals are serially transferable between individual user stations 10, 20, 30 via bus 40. If an error occurs during the communication on bus 40, as illustrated by the serrated dark block arrow in FIG. 1, an error frame 47 (error flag) may optionally be transmitted. User stations 10, 20, 30 are, for example, control units, sensors, display devices, etc., of a motor vehicle.

As shown in FIG. 1, user station 10 includes a communication control device 11, a transceiver device 12, and a bit length adaptation module 15. User station 20 includes a communication control device 21, a transceiver device 22, and optionally a bit length adaptation module 25. User station 30 includes a communication control device 31, a transceiver device 32, and a bit length adaptation module 35. Transceiver devices 12, 22, 32 of user stations 10, 20, 30 are each directly connected to bus 40, although this is not illustrated in FIG. 1.

Communication control devices 11, 21, 31 are each used for controlling a communication of particular user station 10, 20, 30 via bus 40 with at least one other user station of user stations 10, 20, 30 connected to bus 40.

Communication control devices 11, 31 create and read first messages 45, which are modified CAN messages 45, for example. Modified CAN messages 45 are built up based on a CAN XL format, described in greater detail with reference to FIG. 2, and in which particular bit length adaptation module 15, 35 is used. Communication control devices 11, 31 may also be designed to provide a CAN XL message 45 or a CAN FD message 46 for transceiver device 32 or receive it from same, as needed. Particular bit length adaptation modules 15, 35 may also be used. Communication control devices 11, 31 thus create and read a first message 45 or second message 46, first and second messages 45, 46 differing by their data transmission standard, namely, CAN XL or CAN FD in this case.

Communication control device 21 may be designed as a conventional CAN controller according to ISO 11898-1: 2015, i.e., as a CAN FD-tolerant conventional CAN controller or a CAN FD controller. In addition, bit length adaptation module 25, which has the same function as bit length adaptation modules 15, 35, is optionally present. Communication control device 21 creates and reads second messages 46, for example CAN FD messages 46. CAN FD messages 46 may include 0 to 64 data bytes, which are also transferred at a much faster data rate than with a conventional CAN message. In particular, communication control device 21 is designed as a conventional CAN FD controller.

Transceiver device 22 may be designed as a conventional CAN transceiver according to ISO 11898-1:2015 or as a CAN FD transceiver. Transceiver devices 12, 32 may be designed to provide messages 45 according to the CAN XL format or messages 46 according to the present CAN FD format for associated communication control device 11, 31 or receive the messages from same, as needed.

A formation and then transfer of messages 45 having the CAN XL format, in addition to the reception of such messages 45, is achievable by use of the two user stations 10, 30.

Figure 2:
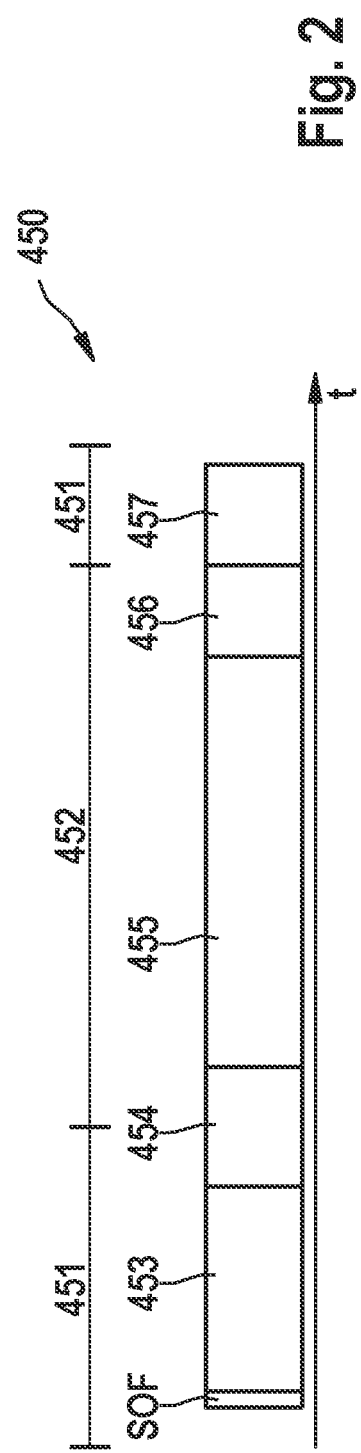
FIG. 2 shows a diagram for illustrating the design of a message that may be transmitted from a user station of the bus system according to the first exemplary embodiment of the present invention.

FIG. 2 shows for message 45 a CAN FX frame 450, which in particular is a CAN XL frame and which is provided by communication control device 11 for transceiver device 12 for transmitting onto bus 40. In the present exemplary embodiment, communication control device 11 creates frame 450 so as to be compatible with CAN FD. The same analogously applies for communication control device 31 and transceiver device 32 of user station 30.

According to FIG. 2, for the CAN communication on bus 40, frame 450 is divided into different communication phases 451, 452, namely, an arbitration phase 451 and a data phase 452. Frame 450, after a start bit SOF, includes an arbitration field 453, a control field 454, a data field 455, a check sum field 456, and a frame termination field 457.

In arbitration phase 451, with the aid of an identifier ID including, for example, bits ID28 through ID18 in arbitration field 453, bitwise negotiation is carried out between user stations 10, 20, 30 concerning which user station 10, 20, 30 would like to transmit message 45, 46 having the highest priority, and therefore for the next time period for transmitting in subsequent data phase 452 obtains exclusive access to bus 40 of bus system 1. A physical layer, similarly as with CAN and CAN FD, is used in arbitration phase 451. The physical layer corresponds to the bit transfer layer or layer one of the Open Systems Interconnection (OSI) model.

An important point during phase 451 is that the conventional CSMA/CR method is used, which allows simultaneous access of user stations 10, 20, 30 to bus 40 without destroying higher-priority message 45, 46. It is thus possible to add further bus user stations 10, 20, 30 to bus system 1 in a relatively simple manner, which is very advantageous.

Consequently, the CSMA/CR method must provide so-called recessive states on bus 40, which may be overwritten by other user stations 10, 20, 30 with dominant states on bus 40. In the recessive state, high-impedance conditions prevail at individual user station 10, 20, 30, which in combination with the parasites of the bus wiring result in longer time constants. This results in a limitation of the maximum bit rate of the present-day CAN FD physical layer to approximately 2 megabits per second at the present time during actual vehicle use.

In data phase 452, in addition to a portion of control field 454, the useful data of the CAN XL frame or of message 45 from data field 455 and check sum field 456 are transmitted. Check sum field 456 may contain a check sum of the data of data phase 452, including the stuff bits, which are inserted as an inverse bit by the sender of message 45, in each case after a predetermined number of identical bits, in particular 10 identical bits. At the end of data phase 452, a switch is made back into arbitration phase 451.

At least one acknowledge bit may be contained in an end field in frame termination phase 457. In addition, a sequence of 11 identical bits that indicate the end of CAN XL frame 450 may be present. By use of the at least one acknowledge bit, it may be communicated whether or not a receiver has found an error in received CAN XL frame 450 or message 45.

A sender of message 45 starts a transmission of bits of data phase 452 onto bus 40 only after user station 10, as the sender, has won the arbitration, and user station 10, as the sender, thus has exclusive access to bus 40 of bus system 1 for the transmission.

In a bus system with CAN XL, proven properties that are responsible for the robustness and user-friendliness of CAN and CAN FD, in particular a frame structure including identifiers and arbitration according to the CSMA/CR method, are taken on. Thus, in arbitration phase 451, user station 10 partially uses as the first communication phase, in particular up to and including the FDF bit, a format from CAN/CAN FD according to ISO 11898-1:2015. However, in comparison to CAN or CAN FD, in data phase 452 as the second communication phase, increasing the net data transfer rate, in particular to approximately 10 megabits per second, is possible. In addition, increasing the quantity of the useful data per frame to approximately 2 kbytes or an arbitrary value is possible.

Figure 3:
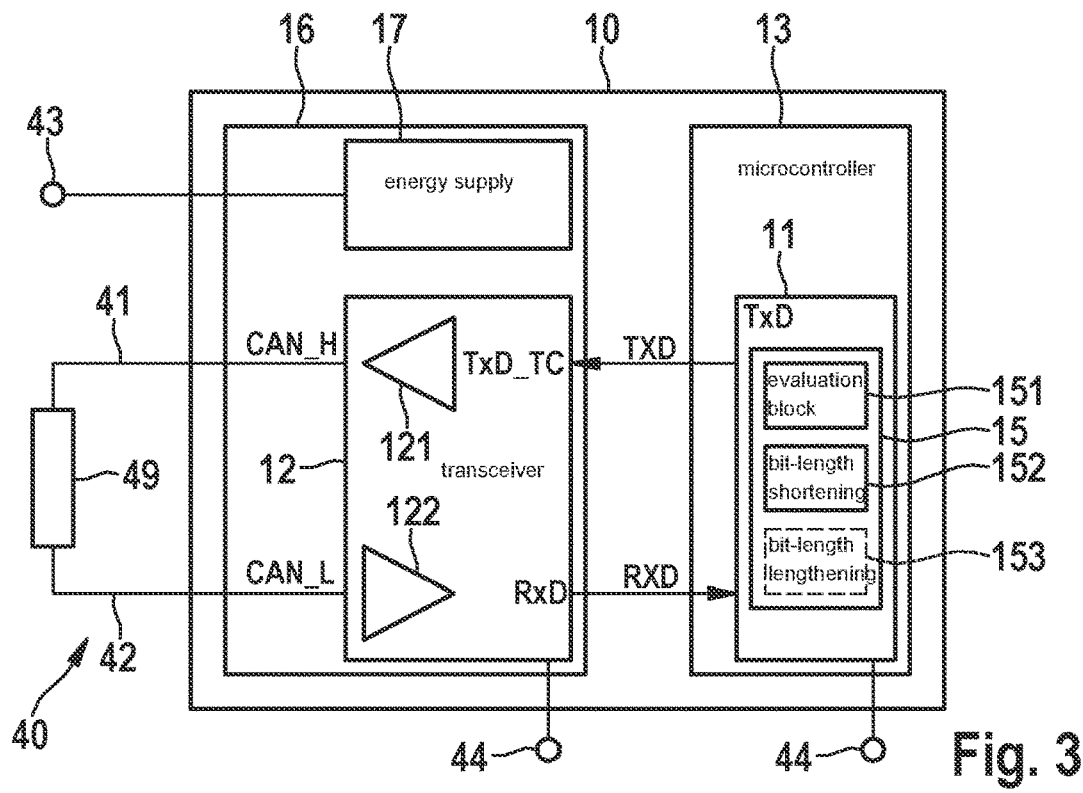
FIG. 3 shows a simplified schematic block diagram of a user station of the bus system according to the first exemplary embodiment of the present invention.

FIG. 3 shows the basic design of user station 10 together with communication control device 11, transceiver 12, and bit length adaptation module 15, which is part of communication control device 11. User station 20 has a basic design similar to that shown in FIG. 3, except for the differences stated above. User station 30 has a design similar to that shown in FIG. 3, except that bit length adaptation module 35 according to FIG. 1 is situated separately from communication control device 31 and transceiver device 32. Therefore, user station 30 is not separately described.

According to FIG. 3, in addition to communication control device 11 and transceiver device 12, user station 10 includes a microcontroller 13 with which control device 11 is associated, and a system application-specific integrated circuit (ASIC) 16, which alternatively may be a system base chip (SBC) on which multiple functions necessary for an electronics assembly of user station 10 are combined. In addition to transceiver device 12, an energy supply device 17 that supplies transceiver device 12 with electrical energy is installed in system ASIC 16. Energy supply device 17 generally supplies a voltage CAN Supply of 5 V. However, depending on the requirements, energy supply device 17 may supply some other voltage having a different value. Additionally or alternatively, energy supply device 17 may be designed as a power source.

Bit length adaptation module 15 includes an evaluation block 151 that evaluates transmission signal TxD on bit sequences including bits having the same logical value and evaluates reception signal RxD, a bit length shortening block 152, and optionally a bit length lengthening block 153 and an error frame counting block 154. Blocks 151, 152, 153, 154 are described in greater detail below.

Transceiver device 12 also includes a transmission module 121 and a reception module 122. Even though transceiver device 12 is consistently referred to below, it is alternatively possible to provide reception module 122 in a separate device externally from transmission module 121. Transmission module 121 and reception module 122 may be designed as a conventional transceiver device 22. Transmission module 121 may in particular include at least one operational amplifier and/or one transistor. Reception module 122 may in particular include at least one operational amplifier and/or one transistor.

Transceiver device 12 is connected to bus 40, or more precisely, to its first bus wire 41 for CAN_H or CAN XL_H and its second bus wire 42 for CAN_L or CAN XL_L. The supplying of voltage for energy supply device 17 for supplying first and second bus wires 41, 42 with electrical energy, in particular with voltage CAN Supply, takes place via at least one terminal 43. The connection to ground or CAN_GND is achieved via a terminal 44. First and second bus wires 41, 42 are terminated via a terminating resistor 49.

In transceiver device 12, first and second bus wires 41, 42 are not just connected to transmission module 121, also referred to as a transmitter, but also to reception module 122, also referred to as a receiver, even though the connection in FIG. 3 is not shown for simplification.

Figure 4:
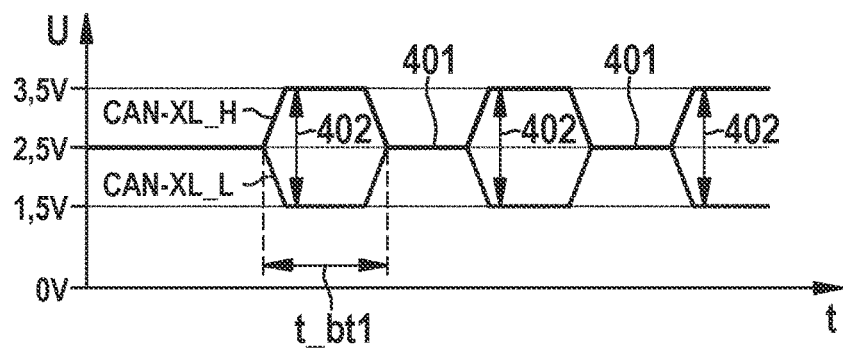
FIG. 4 shows a temporal profile of bus signals CAN XL_H and CAN XL_L for the user station according to the first exemplary embodiment of the present invention.

During operation of bus system 1, transmission module 121 converts a transmission signal TXD or TxD of communication control device 11 into corresponding signals CAN XL_H and CAN XL_L for bus wires 41, 42, and transmits these signals CAN XL_H and CAN XL_L onto bus 40 at the terminals for CAN_H and CAN_L, as shown in FIG. 4.

According to FIG. 4, reception module 122 forms a reception signal RXD or RxD from signals CAN XL_H and CAN XL_L that are received from bus 40, and passes it on to communication control device 11, as shown in FIG. 3. With the exception of an idle or standby state, transceiver device 12 with reception module 122 during normal operation always listens to a transfer of data or messages 45, 46 on bus 40, in particular regardless of whether or not transceiver device 12 is the sender of message 45.

According to the example from FIG. 4, signals CAN XL_H and CAN XL_L, at least in arbitration phase 451, include dominant and recessive bus levels 401, 402, as from CAN. A difference signal VDIFF=CAN XL_H−CAN XL_L, shown in FIG. 5 for arbitration phase 451, is formed on bus 40. The individual bits of signal VDIFF with bit time t_bt1 may be recognized in arbitration phase 451 using a reception threshold T a of 0.7 V, for example. In data phase 452 the bits of signals CAN XL_H and CAN XL_L are transmitted more quickly, i.e., with a shorter bit time t_bt2, than in arbitration phase 451. Thus, signals CAN XL_H and CAN XL_L in data phase 452 differ from conventional signals CAN_H and CAN_L, at least in their faster bit rate.

Figure 5:
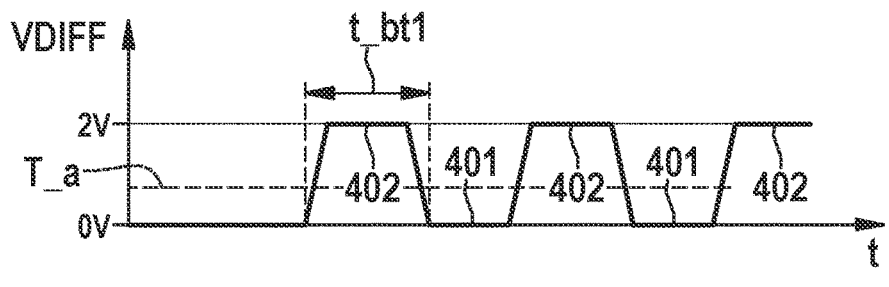
FIG. 5 shows a temporal profile of a differential voltage VDIFF of bus signals CAN XL_H and CAN XL_L for the user station according to the first exemplary embodiment of the present invention.

The sequence of states 401, 402 for signals CAN XL_H, CAN XL_L in FIG. 4 and the resulting pattern of voltage VDIFF from FIG. 5 are used only for illustrating the function of user station 10. The sequence of data states for bus states 401, 402 is selectable as needed.

In other words, transmission module 121, when it is switched into a first operating mode B_451 (SLOW), according to FIG. 4 generates a first data state as bus state 402 with different bus levels for two bus wires 41, 42 of the bus line, and a second data state as bus state 401 with the same bus level for the two bus wires 41, 42 of the bus line of bus 40.

In addition, transmission module 121 transmits the bits onto bus 40 at a higher bit rate for the temporal profiles of signals CAN XL_H, CAN XL_L in a second operating mode B_452_TX (FAST_TX), which includes data phase 452. CAN XL_H and CAN XL_L signals may also be generated in data phase 452 with a different physical layer than with CAN FD. The bit rate in data phase 452 may thus be increased even further than with CAN FD. A user station that is not a sender of frame 450 in data phase 452 sets a third operating mode B_452_RX (FAST_RX) in its transceiver device.

Bit length adaptation module 15 from FIG. 3 is active when user station 10 acts as sender and/or receiver of frame 450. Bit length adaptation module 15, in particular its evaluation block 151, evaluates the bit sequences in frame 450 before communication control device 11 passes on a TxD signal as a TxD_TC signal at terminal TXD to transceiver device 12 for transmission onto bus 40. In addition, bit length adaptation module 15, in particular its bit length shortening block 152, may shorten bits of the TxD signal for the TxD_TC signal when a bit sequence of at least three bits having the same logical value occurs in the TxD signal, as described in greater detail below.

The method carried out by bit length adaptation module 15 is particularly suitable for data phase 452, where one of user stations 10, 20, 30 has exclusive access to bus 40 in order to transmit one of messages 45, 46, in particular as frame 450. However, bit length adaptation module 15 may alternatively or additionally use the method in arbitration phase 451.

Figure 6:
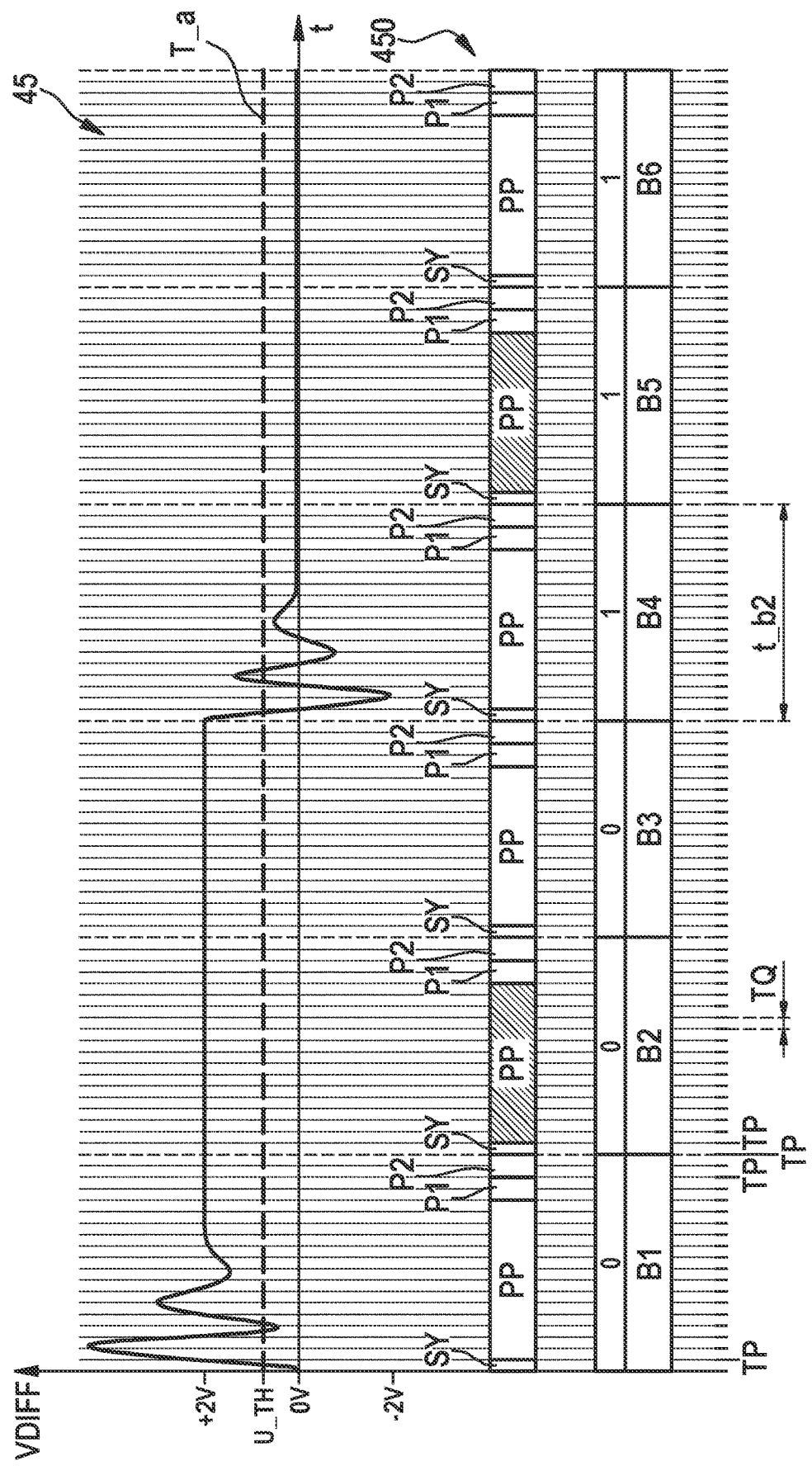
FIG. 6 shows a temporal profile of a portion of a signal that occurs during transmission of a frame to terminals of the user station according to the first exemplary embodiment, when a bit length adaptation module is not active.

FIG. 6 shows, as a function of time t, an example of a difference signal VDIFF that has formed due to a digital transmission signal TxD on bus 40. Transmission signal TxD may be generated either according to frame 450 or according to the protocol for CAN FD.

The bit sequence shown includes six bits, namely, bits B1 through B6. Bits B1 through B6 have bit length t_bt2, for example, i.e., bits of data phase 452. However, the bit sequence may occur in an arbitrary portion of frame 450. The bit sequence may thus occur in first and/or second communication phase 451, 452 of a frame 450. Transmission signal TxD is generated by communication control device 11 as the sender of frame 450, is modified in bit length adaptation module 152 as described in greater detail below, and is then serially transmitted as transmission signal TxD_TC to transceiver device 12.

Each bit of bits B1 through B6 has the same design. Each bit of signal VDIFF, and thus also bits B1 through B6, is/are divided over time t into four segments SY, P1, PP, P2. A sampling point TP is provided between first segment SY and second segment PP. In addition, each bit of signal VDIFF is divided over time t into a plurality of time quanta TQ, each having the same length. The number of time quanta TQ is the same in all bits. Time quanta TQ are associated with individual segments SY, PP, P1, P2, segments SY, PP, P1, P2 over time t having different lengths, in other words, having different numbers of time quanta TQ. In the example of FIG. 6, segments P1, P2 over time t each have the same length. In other words, segments P1, P2 have the same number of time quanta TQ.

A synchronization segment SY having the length of one time quantum TQ is provided at the start of a bit B1 through B6. This is followed by a propagation segment PP that includes multiple time quanta TQ. A first sampling point TP for sampling the bit is situated between segment SY and segment PP. Segment PP is followed by a first phase P1 prior to a second sampling point TP for sampling the bit. Second sampling point TP is followed by a second phase P2. If a transition between two different logical values occurs in transmission signal TxD, i.e., between 1 and 0 or between 0 and 1, a reception node or receiver of frame 450 may check whether or not the transition occurs at an expected time. If the transition does not occur at the expected time, which is at the start of the bit, the receiver of frame 450 may compute the time difference and adjust the temporal length of phase P1 or the temporal length of phase P2, depending on the result. In this way, the receiver may continuously synchronize with the time clocking of the transmission node or sender of frame 450. This reduces errors that occur due to irradiation on bus 40 (physical layer effects).

Communication control device 11 is designed to sample, in a signal RxD received from bus 40, a bit B1 through B6 at first sampling point TP and at second sampling point TP, each of which is situated between two of segments SY, PP, P1, P2.

In the example from FIG. 6, difference signal VDIFF alternates its voltage level U between values of approximately +2 V and −2 V. The change is determined by digital transmission signal TxD or TxD_TC, which is coupled into bus 40 and alternates between the logical bit values 0 and 1. Overshootings of difference signal VDIFF occur in each case at the changes between the bit values 0 and 1 or 1 and 0. The particular value of a bit B1 through B6 of difference signal VDIFF is ascertained in transceiver device 12 by comparing to a threshold value voltage U_TH of reception threshold T a. Transceiver device 12 forms reception signal RxD in the process. If voltage level U of difference signal VDIFF is below threshold value voltage U_TH, difference signal VDIFF corresponds to the logical value 0 of digital transmission signal TxD. If voltage level U of difference signal VDIFF is above threshold value voltage U_TH, difference signal VDIFF corresponds to the logical value 1 of digital transmission signal TxD. In the ideal case, the logical values of reception signal RxD correspond to the logical values of transmission signal TxD. Otherwise, an error is present.

When user station 10 creates transmission signal TxD from FIG. 6, bit length adaptation module 15, in particular its evaluation block 151, recognizes a bit sequence 111 after a bit value 0 in signal TxD. Bit sequence 111 is formed from three bits B1 through B3. Bit length adaptation module 15, in particular its evaluation block 151, subsequently recognizes a bit sequence 000 in signal TxD. Bit sequence 000 is formed from three bits B4 through B6.

Figure 7:
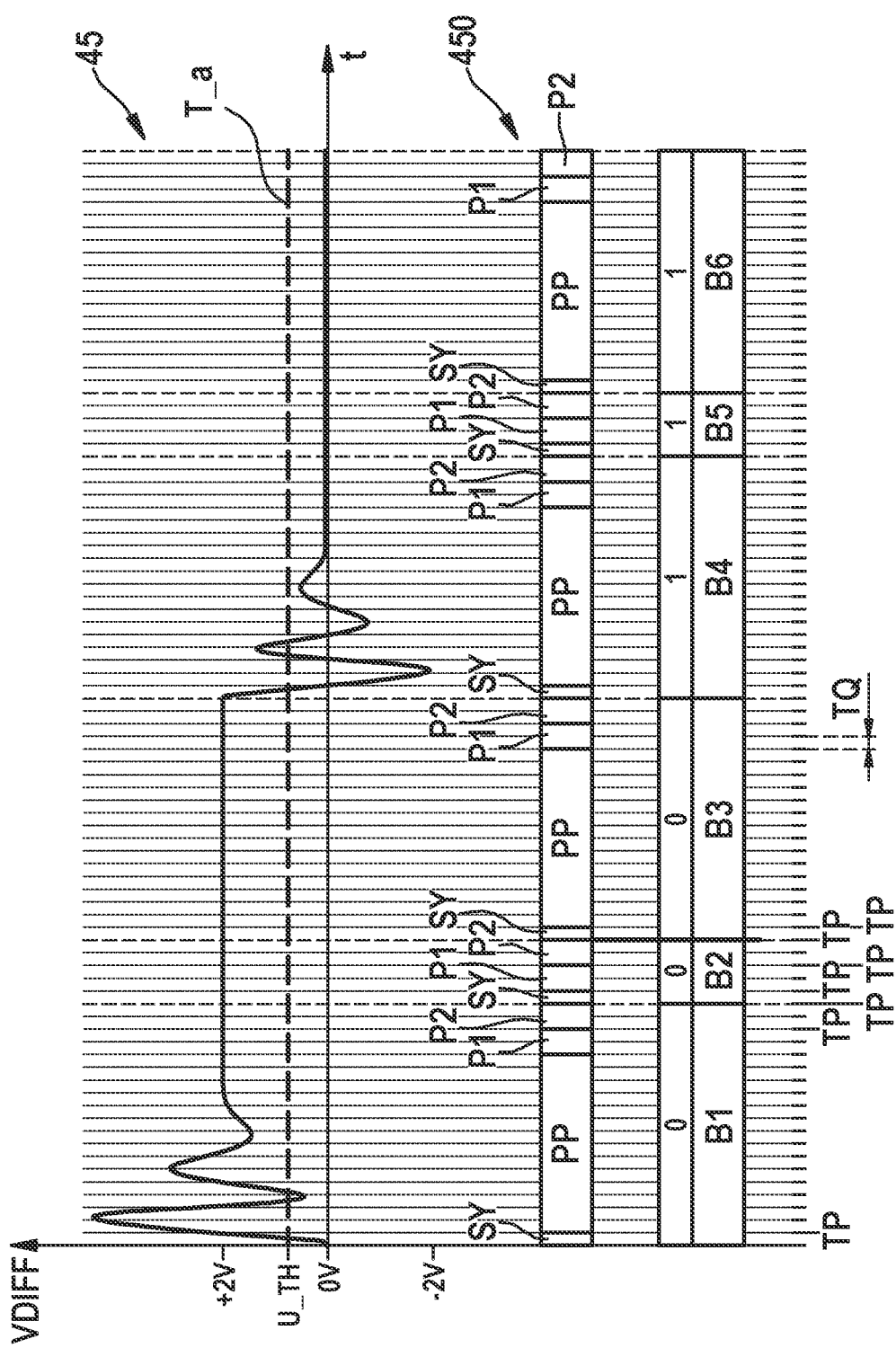
FIG. 7 shows a temporal profile of a portion of a signal that occurs during transmission of a frame to terminals of the user station according to the first exemplary embodiment, when a bit length adaptation module is active.

Thus, for both bit sequences, in each case three bits having the same logical value are present in digital transmission signal TxD. Bit length shortening block 152 may thus shorten the bit sequence, as illustrated in FIG. 7. This is carried out by bit length adaptation module 15 as follows.

Evaluation block 151 checks at which bit of bits B1 through B6 of transmission signal TxD a change in the logical value takes place at the start or at the end of the bit. For this purpose, evaluation block 151 checks, for example, when an edge occurs between two bits. If three or more bits having the same logical value are transferred, the bits that are not situated at the edges of the bit sequence may be transmitted in shortened form. In other words, based on the evaluation result of evaluation block 151, bit length shortening block 152 shortens the bits that include no edge (bit value change) at the start or at the end of the bit.

For the case of FIG. 7, in first bit sequence 111 from FIG. 7, bit length shortening block 152 has therefore shortened bit B2. Bit length shortening block 152 omits segment PP for bit B2. The lengths of bits B1, B3 are unchanged in each case. In addition, in second bit sequence 000 from FIG. 7, bit length shortening block 152 has shortened bit B5. Bit length shortening block 152 omits segment PP for bit B2 [sic; B5]. The lengths of bits B4, B6 are unchanged in each case.

Bit length shortening block 152 carries out a similar procedure, for example, for a sequence of 5 bits having the same logical value in transmission signal TxD. In this case, the second through fourth bit of the bit sequence of five bits is shortened in each case by segment PP. In contrast, the lengths of the first and fifth bit of the bit sequence are unchanged.

The shortening is very advantageous for bits B2, B4 in the example from FIGS. 6 and 7, since without a state change or edge between two bits, no physical layer effects occur. Thus, no irradiations are caused at bus 40 which could result in errors in signal VDIFF on bus 40. Since segment PP is the dominating portion of a bit B1 through B6 in terms of length or time, bit length adaptation module 15 may greatly reduce the bit rate. For high bit rates of 5 Mbit/s, over one-half of bit time t_bt1, t_bt2 may be saved. This may mean up to a doubling of the bit rate.

In general, bit length adaptation module 15 may be set to shorten the bits of a bit sequence when more than one bit having the same logical value is to be transmitted onto bus 40. In this case as well, disturbances and errors can no longer act on these bits.

In contrast, if user station 10 is a receiving user station of bus system 1, which at the present time is not a sender of frame 450, but instead only receives frame 450 (reception node), user station 10 via its evaluation block 151 recognizes the shortened bit length by sampling at sampling points TP of reception signal RxD. In particular, communication control device 11 samples reception signal RxD after each time quantum TQ. As a result, a reception node may correctly sample the bits of signal VDIFF according to FIG. 7 which the reception node receives from bus 40 at its terminals CAN_H, CAN_L. Optionally, bit length lengthening block 153 may once again lengthen the bits of reception signal RxD, recognized as shortened, to the normal length. Alternatively, communication control device 11 evaluates reception signal RxD. In particular, communication control device 11 samples reception signal RxD after each time quantum TQ, but using the bits having different lengths.

By use of this embodiment of user stations 10, 20, 30 of bus system 1, more bits may be transferred via bus 40 in the same time period. The data rate in bus system 1 is thus increased.

If a user station 10, 20, 30 that does not understand the bit time shortening is to be at bus 40, this user station 10, 20, 30 will disturb the communication in bus system 1 via error frames 47 when one of bit length adaptation modules 15, 25, 35 is active for a transmission signal TxD. In such a case, error frame counting block 154 counts error frames 47 received from bus 40. Beginning at a certain number of error frames 47, evaluation block 151 evaluates that the method is no longer used for shortening at least one bit of a bit sequence. Instead, communication control device 11 then uses only the conventional protocol, in which no shortening of bits is used. Associated bit length adaptation module 15, 25, 35 of user station 10, 20, 30 is thus deactivated.

A robust emergency operation of the communication in bus system 1 is thus possible. This is advantageous in particular when bus system 1 is used in a vehicle. The emergency operation is then ensured, for example, while the vehicle is traveling.

Communication control device 11, in particular its evaluation block 151, may reduce the count value of error frame counting block 154 when a message 45 that includes at least one shortened bit of a bit sequence is successfully sent. In this way, sporadic errors that are not caused by an incompatibility of the communication protocols of user station 10, 20, 30 at bus 40 do not result in a reduction in the possible transferable baud rate in bus system 1.

In contrast, for a software update of the vehicle in a repair shop, it may be desired to work using the highest possible data rate. This may be the case when the data of the new software are of interest only for an individual user station at bus 40. For such a case, it is possible for a repair shop tester to use the above-described method for shortening bits in a targeted manner during the transmission of messages 45, 46 in bus 40 until the incompatible user station(s) prevent(s) the transmission of error frames 47 and go(es) into an error state of exception. Beginning at this point in time, communication control device 11 may use the above-described described method for shortening at least one bit of a bit sequence undisturbed during the transmission of messages 45, 46 according to FIG. 7. The software update may thus be transferred in a shorter time than with conventional messages 45, 46 including bits of normal length, as shown in FIG. 6.

According to one modification of the present exemplary embodiment, bit length adaptation module 15 additionally or alternatively shortens the first or last bit of a bit sequence having the same logical value, for example bit B1 or bit B3 of first bit sequence 111 in FIG. 6. However, an additional shortening of the first or last bit of a bit sequence having the same logical value is usually more advantageous than an alternative shortening for increasing the net data rate in bus system 1.

At the edge of the bit, the first bit as well as the last bit of the bit sequence has only a single edge with which the reception node synchronizes. For the shortening, bit length adaptation module 15 may shorten segment PP or may omit it. Bit length adaptation module 15 assumes that the synchronization edge at the start or end of a bit is perfect by definition. In such a case, no physical layer effects are to be taken into account or tolerated, or fewer physical layer effects occur, for this bit at the start or end of the bit sequence. Segment PP may thus be shortened or omitted also for this bit at the start or end of the bit sequence.

For a CAN-based bus system, communication control device 11 synchronizes itself with the increasing differential voltage that occurs during a change from a bit having logical value 1 to a bit having logical value 0. Therefore, for a bit sequence 0111110, bit length adaptation module 15, in particular its block 152, could shorten the second through fifth bits of bit sequence 11111. For bit sequence 1000001, bit length adaptation module 15, in particular its block 152, could shorten the first through fourth bits of bit sequence 00000.

Alternatively, it is possible for bit length adaptation module 15 to shorten only the first bit or the last bit of a bit sequence having the same logical value.

The described modification and its alternative allow an even higher data rate than with the exemplary embodiment described above.

According to another modification of the present exemplary embodiment, bit length adaptation module 15 individually shortens segment PP of one of the bits described above. For example, bit length adaptation module 15 may shorten segment PP of one of the above-described bits as a function of which of the transitions take place in the bit. Bit length adaptation module 15 may thus individually reduce the value of the shortening of segment PP as a function of whether a transition from 0 to 1 or from 1 to 0 takes place. In addition, the shortening of segment PP of a bit between the start bit and end bit of the bit sequence may have some other value. For bit sequence 111 from FIG. 7, bit length adaptation module 15 could, for example, shorten bit B1 by ⅓ the length of segment PP from FIG. 6, while shortening bit B2 by ½ the length of segment PP from FIG. 6.

The modification for the individual shortening of the bits is advantageous in particular when differential voltages of 0 volt and 2 volts are used, and in particular when a change is made between dominant and recessive bits. In this case, the distortion of the edges between the bits may differ greatly. The difference is [based on] whether the differential voltage goes or changes from 2 volts to 0 volt or from 0 volt to 2 volts.

Therefore, bit length adaptation module 15 may select segment PP individually for each of the two transitions. Additionally or alternatively, bit length adaptation module 15 may individually establish the shortening of segment PP if no transition takes place, depending on which bits in the same sequence are transferred.

The described modifications and their alternatives, when additionally applied, in each case allow an even higher data rate than with the exemplary embodiment described above.

FIG. 8 shows a signal VDIFF on bus 40 that is formed by bit length adaptation module 15 according to a second exemplary embodiment. For this purpose, bit length adaptation module 15 carries out a method that differs from the method according to the preceding exemplary embodiment in the following aspects.

As shown in FIG. 8, bit length shortening block 152 is designed to additionally shorten segments P1, P2 of bits B2, B3 in bit sequence 111 that is formed from bits B1 through B3. Bits B2, B3 are the bits in bit sequence 111 for which segment PP is omitted. In addition, in bit sequence 000 of bits B4 through B6, bit length shortening block 152 has shortened segments P1, P2 of bits B5, B6, which are shortened by segment PP.

The shortening of at least one bit of bit sequence B1 through B3 in the signal from FIG. 6 with regard to segments P1, P2, so that the signal from FIG. 8 results, is easily possible due to the fact that less phase error is accumulated due to shorter bits.

For the shortening of segments P1, P2, bit length shortening block 152 takes into account that a synchronization error must not result in the possibility of a bit that was not transmitted being erroneously received, or of a bit that was transmitted, erroneously not being received. Bit length shortening block 152 ensures this by dimensioning segments P1, P2 to be sufficiently large. In FIG. 8, for example segment P2 of bit B3 is selected to be larger than bit B2 in bit sequence 111. In other words, in the last bit of a bit sequence of bits having the same logical value, segment P2 is larger than in a bit that is neither the first nor the last bit of the bit sequence.

Since segment SY is always present at the start of the bit in each bit of the signal from FIG. 6 and of the signal from FIG. 8, a reception node may always make a synchronization for segment SY if necessary. However, when the level of signal VDIFF is unchanged, segment SY is used only to establish the unchanged level.

In other respects, the mode of operation of bus system 1 is identical to the first exemplary embodiment.

According to a third exemplary embodiment, bit length shortening block 152 is designed to leave segments P1, P2 in their original length. In addition, bit length shortening block 152 is designed to transmit the stuff bits after the same number of time quanta TQ, but to transmit a stuff bit only after a greater number of bits than in other portions of frame 450.

In this case, a similar shortening of signal VDIFF may be achieved as with the second exemplary embodiment, in which at least one of segments P1, P2 of a bit B1 through B6 is to be shortened.

As a result, for the third exemplary embodiment a similar net data rate is achievable as for the second exemplary embodiment.

FIG. 9 shows a frame 450A according to a fourth exemplary embodiment. Frame 450A may be used by communication control device 11 to generate transmission signal TxD and/or to evaluate reception signal RxD, as described above.

In frame 450A, at least one bit B_V is contained in control field 454. The fewer bits B_V that are contained, the less the transferable net data rate in bus system 1 is lowered.

The at least one bit B_V indicates whether or not bit sequence(s) of bits having the same logical value in a reception signal RxD, presently received from bus 40, is/are to be transmitted in shortened form.

Thus, a transmission node may communicate to a reception node at bus 40, which includes the at least one bit B_V, how presently received reception signal RxD is to be evaluated. When evaluating presently received reception signal RxD, the reception node may thus correctly take into account the shortening of bit sequences that has taken place.

In other words, the use of the above-described method of shortening the bit sequence of bits having the same logical value according to FIG. 7 or FIG. 8 may be announced via a reserved bit in the header of a message 45.

The downward compatibility with conventional communication protocols, in particular CAN-based protocols, is thus ensured.

Alternatively, the at least one bit B_V is contained in data field 455.

FIG. 10 shows a frame 450B according to a fifth exemplary embodiment. Frame 450B may be used by communication control device 11 to generate transmission signal TxD and/or to evaluate reception signal RxD, as described above.

In frame 450B, at least one bit B_V is contained in control field 455. The at least one bit B_V indicates that in a message 45 that is soon to be transmitted via bus 40, the bit sequence(s) of bits having the same logical value is/are transmitted in shortened form. Thus, a reception node knows whether bit sequence(s) of bits having the same logical value is/are shortened in a subsequent reception signal RxD, as shown in FIG. 7 or FIG. 8.

If more than one bit B_V is contained, it may be communicated which message 45, 46 of the subsequent messages at bus 40 is to be modified in such a way that the bit sequence(s) of bits having the same logical value is/are shortened. For example, a specific identifier for this message 45, 46 may then be encoded in a bit sequence of at least two bits B_V.

A transmission node may thus communicate to a reception node containing bit B_V how reception signal RxD of next message 45, 46 received from bus 40 is to be evaluated. The reception node may thus correctly take into account the shortening of bit sequences that has taken place when evaluating presently received reception signal RxD.

In other words, the use of the above-described method of shortening the bit sequence of bits having the same logical value according to FIG. 7 or FIG. 8 may have been announced in a preceding message.

It is possible to use, at least in sections, a shortening of the bit sequence of bits having the same logical value also in the message that has been created based on a frame 450B.

The downward compatibility with conventional communication protocols, in particular CAN-based protocols, is thus also ensured.

All of the above-described embodiments of user stations 10, 20, 30, of bus system 1, and of the method carried out therein may be used alone or in any possible combination. In particular, all features of the above-described exemplary embodiments and/or modifications thereof may be arbitrarily combined. Additionally or alternatively, in particular the following modifications are possible.

Although the present invention is described above with the example of the CAN bus system, the present invention may be employed for any communications network and/or communication method in which two different communication phases are used in which the bus states, which are generated for the different communication phases, differ. In particular, the present invention is usable for developments of other serial communications networks, such as 100Base-T1 Ethernet, field bus systems, etc.

In particular, bus system 1 according to the exemplary embodiments may be a communications network in which data are serially transmittable at two different bit rates. It is advantageous, but not a mandatory requirement, that in bus system 1, exclusive, collision-free access of a user station 10, 20, 30 to a shared channel is ensured, at least for certain time periods.

The number and arrangement of user stations 10, 20, 30 in bus system 1 of the exemplary embodiments is arbitrary. In particular, user station 20 in bus system 1 may be dispensed with. It is possible for one or multiple of user stations 10 or 30 to be present in bus system 1. It is possible for all user stations in bus system 1 to have the same design, i.e., for only user station 10 or only user station 30 to be present.

What is claimed is:

1. A communication control device for a user station for a serial bus system, the communication control device being configured to:
    control a communication of the user station with at least one other user station of the bus system, and generate a transmission signal for transmission onto a bus of the bus system and/or receive a signal from the bus;
    generate the transmission signal according to a frame in which bits having a predetermined temporal length are provided;
    shorten, in comparison to some other bit of a bit sequence, at least one bit in the frame that is situated in a bit sequence of at least two bits having the same logical value, and not shorten bits that are not situated in the bit sequence of at least two bits having the same logical value,
    wherein each bit is divided into four segments over time without shortening, a first sampling point being provided between a first segment of the segments and a second segment of the segments, a second sampling point being provided between a third segment of the segments and a fourth segment of the segments.

2. A communication control device for a user station for a serial bus system, the communication control device being configured to:
    control a communication of the user station with at least one other user station of the bus system, and generate a transmission signal for transmission onto a bus of the bus system and/or receive a signal from the bus;
    generate the transmission signal according to a frame in which bits having a predetermined temporal length are provided;
    shorten, in comparison to some other bit of a bit sequence, at least one bit in the frame that is situated in a bit sequence of at least two bits having the same logical value, and not shorten bits that are not situated in the bit sequence of at least two bits having the same logical value,
    wherein each bit is divided into four segments over time without shortening, a first sampling point being provided between a first segment of the segments and a second segment of the segments, a second sampling point being provided between a third segment of the segments and a fourth segment of the segments, and wherein the communication control device configured to use the first and second sampling points for determining a logical value of the bit in a reception signal which the communication control device receives for the transmission signal that is transferred via the bus.

3. The communication control device as recited in claim 2, wherein two segments of the segments are situated between the first sampling point and the second sampling point without shortening the bit.

4. The communication control device as recited in claim 2, wherein the communication control device is configured to shorten a second bit of the bit sequence and each subsequent bit of the bit sequence.

5. The communication control device as recited in claim 2, wherein the communication control device is configured to shorten a segment in a second bit of the bit sequence directly preceding the second sampling point and each subsequent bit in the bit sequence, the communication control device being configured to shorten a segment in the second bit of the bit sequence situated directly after the second sampling point and each subsequent bit in the bit sequence less than a segment in a last bit of the bit sequence situated directly after the second sampling point.

6. The communication control device as recited in claim 1, wherein the communication control device is configured to shorten a bit, situated between a first bit and a last bit of the bit sequence, more than the last bit of the bit sequence.

7. The communication control device as recited in claim 6, wherein the communication control device is configured to shorten the last bit of the bit sequence more than the first bit of the bit sequence.

8. The communication control device as recited in claim 3, wherein the communication control device is configured to individually determine for each bit a length of a shortening of the bit of the bit sequence.

9. The communication control device as recited in claim 1, wherein the communication control device includes a processor, wherein the processor is configured to:
    evaluate whether the bit sequence of at least two bits having the same logical value is present in a transmission signal that is generated by the communication control device; and
    shorten at least one bit in the bit sequence that has been determined by the evaluation block during the evaluation.

10. The communication control device as recited in claim 1, wherein the communication control device includes a processor, wherein the processor is configured to:

lengthen at least one bit in the bit sequence, which is contained as a shortened bit in a signal that is received from the bus, and/or
count error frames that are received from the bus.

11. A communication control device for a user station for a serial bus system, the communication control device being configured to:
control a communication of the user station with at least one other user station of the bus system, and generate a transmission signal for transmission onto a bus of the bus system and/or receive a signal from the bus;
generate the transmission signal according to a frame in which bits having a predetermined temporal length are provided;
shorten, in comparison to some other bit of a bit sequence, at least one bit in the frame that is situated in a bit sequence of at least two bits having the same logical value, and not shorten bits that are not situated in the bit sequence of at least two bits having the same logical value,
wherein the communication control device is configured to insert at least one predetermined bit into the transmission signal which indicates to a reception node in the bus system that a signal presently received from the bus includes at least one bit that is situated in the bit sequence of at least two bits having the same logical value, and is shortened in comparison to some other bit of the bit sequence.

12. The communication control device as recited in claim 1, wherein the communication control device is configured to generate the transmission signal in such a way that for a message that is exchanged between user stations of the bus system, a bit time of a signal transmitted onto the bus in a first communication phase is different from a bit time of a signal transmitted in the second communication phase, and in the first communication phase, it is negotiated which of the user stations of the bus system in a subsequent second communication phase obtains, at least temporarily, exclusive, collision-free access to the bus, and wherein the communication control device is configured to shorten at least one bit of the bit sequence which includes at least two bits having the same logical value, in the first and/or second communication phase.

13. The communication control device as recited in claim 1, wherein the frame that is formed for the message is compatible with CAN FD and/or CAN XL.

14. A user station for a serial bus system, comprising:
a communication control device configured to: control a communication of the user station with at least one other user station of the bus system, and generate a transmission signal for transmission onto a bus of the bus system and/or receive a signal from the bus, generate the transmission signal according to a frame in which bits having a predetermined temporal length are provided, shorten, in comparison to some other bit of a bit sequence, at least one bit in the frame that is situated in a bit sequence of at least two bits having the same logical value, and not shorten bits that are not situated in the bit sequence of at least two bits having the same logical value; and
a transceiver device configured to transmitting the transmission signal onto the bus of the bus system, the transceiver device configured to transmit an entire frame onto the bus in an operating mode for transmitting and receiving the frame in a first communication phase,
wherein each bit is divided into four segments over time without shortening, a first sampling point being provided between a first segment of the segments and a second segment of the segments, a second sampling point being provided between a third segment of the segments and a fourth segment of the segments.

15. A bus system, comprising:
a bus; and
at least two user stations that are connected to one another via the bus in such a way that they communicate serially with one another, at least one of the user stations including:
a communication control device configured to: control a communication of the user station with at least one other user station of the bus system, and generate a transmission signal for transmission onto the bus and/or receive a signal from the bus, generate the transmission signal according to a frame in which bits having a predetermined temporal length are provided, shorten, in comparison to some other bit of a bit sequence, at least one bit in the frame that is situated in a bit sequence of at least two bits having the same logical value, and not shorten bits that are not situated in the bit sequence of at least two bits having the same logical value; and
a transceiver device configured to transmitting the transmission signal onto the bus of the bus system, the transceiver device configured to transmit an entire frame onto the bus in an operating mode for transmitting and receiving the frame in a first communication phase,
wherein each bit is divided into four segments over time without shortening, a first sampling point being provided between a first segment of the segments and a second segment of the segments, a second sampling point being provided between a third segment of the segments and a fourth segment of the segments.

16. A method for communicating in a serial bus system, the method being carried out using a communication control device for a user station of the bus system, the method comprising the following steps:
controlling, via the communication control device, a communication of the user station with at least one other user station of the bus system; and
generating a transmission signal for transmission onto a bus of the bus system and/or receiving a signal from the bus, the communication control device generating the transmission signal according to a frame in which bits having a predetermined temporal length are provided, the communication control device shortening in the frame, in comparison to some other bit of a bit sequence, at least one bit that is situated in the bit sequence at least two bits having the same logical value, and the communication control device not shortening bits that are not situated in the bit sequence of at least two bits having the same logical value,
wherein each bit is divided into four segments over time without shortening, a first sampling point being provided between a first segment of the segments and a second segment of the segments, a second sampling point being provided between a third segment of the segments and a fourth segment of the segments.

* * * * *